(12) United States Patent
Strobel

(10) Patent No.: US 11,868,118 B2
(45) Date of Patent: Jan. 9, 2024

(54) METHOD FOR CONFIGURING AN INDUSTRIAL AUTOMATION COMPONENT, INDUSTRIAL AUTOMATION COMPONENT, COMPUTER PROGRAM AND COMPUTER READABLE MEDIUM

(71) Applicant: Siemens Aktiengesellschaft, Munich (DE)

(72) Inventor: Holger Strobel, Steinbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/934,139

(22) Filed: Jul. 21, 2020

(65) Prior Publication Data
US 2021/0026337 A1    Jan. 28, 2021

(30) Foreign Application Priority Data

Jul. 22, 2019  (EP) .................................. 19187557

(51) Int. Cl.
*G05B 19/418*    (2006.01)

(52) U.S. Cl.
CPC ............... *G05B 19/41835* (2013.01); *G05B 2219/31229* (2013.01)

(58) Field of Classification Search
CPC .... G05B 19/41835; G05B 2219/31229; G05B 2219/13119; G05B 2219/23266; G05B 2219/25124; G05B 19/056; G05B 2219/23272; G05B 2219/13106; G05B 19/0426; G06F 8/33; G06F 8/41; G06F 9/4411

USPC ................................................. 700/28
See application file for complete search history.

(56) References Cited

U.S. PATENT DOCUMENTS

| | | | |
|---|---|---|---|
| 2002/0059567 A1* | 5/2002 | Minamide | G06F 8/51 |
| | | | 717/151 |
| 2002/0116684 A1 | 8/2002 | Potz et al. | |
| 2004/0205700 A1* | 10/2004 | Leu | G06F 9/44 |
| | | | 717/106 |

(Continued)

FOREIGN PATENT DOCUMENTS

| | | |
|---|---|---|
| EP | 2770384 | 8/2014 |
| EP | 2874033 | 5/2015 |
| EP | 3561617 | 10/2019 |

OTHER PUBLICATIONS

IPDF: TIA Portal entdecken, p. 1-29, Nov. 18, 2011.

*Primary Examiner* — Kenneth M Lo
*Assistant Examiner* — Mohammed Shafayet
(74) *Attorney, Agent, or Firm* — Cozen O'Connor

(57) ABSTRACT

An industrial automation component, a computer program and a computer-readable medium and method for configuring an industrial automation component, wherein at least one feature of the industrial automation component that is not configurable with an engineering system supporting the component, non-supported feature, is configured by interpreting a description of a configuration of the at least one non-supported feature with an on-board compiler of the component and integrating the interpreted description to a basic configuration having been generated with the engineering system and with respect to at least one further feature, supported feature, of the component.

18 Claims, 2 Drawing Sheets

(56) References Cited

U.S. PATENT DOCUMENTS

| | | | |
|---|---|---|---|
| 2006/0015844 A1* | 1/2006 | Johnson | G06F 8/36 |
| | | | 717/106 |
| 2006/0058923 A1 | 3/2006 | Kruk et al. | |
| 2008/0189638 A1* | 8/2008 | Mody | G05B 19/0426 |
| | | | 715/771 |
| 2009/0287913 A1 | 11/2009 | Woods et al. | |
| 2013/0124575 A1 | 5/2013 | Plache et al. | |
| 2015/0127120 A1 | 5/2015 | Telljohann et al. | |
| 2016/0124423 A1 | 5/2016 | Wagener et al. | |
| 2017/0090449 A1 | 3/2017 | Wagener et al. | |
| 2017/0336947 A1* | 11/2017 | Bliss | G06F 3/04842 |
| 2018/0024519 A1* | 1/2018 | Peluso | G05B 19/4065 |
| | | | 340/679 |
| 2018/0150304 A1* | 5/2018 | Kim | G06F 8/41 |
| 2018/0231959 A1* | 8/2018 | Jundt | G05B 23/0224 |
| 2019/0258468 A1* | 8/2019 | Chanda | G06F 8/60 |
| 2020/0103843 A1* | 4/2020 | Stump | G05B 19/056 |

\* cited by examiner

METHOD FOR CONFIGURING AN INDUSTRIAL AUTOMATION COMPONENT, INDUSTRIAL AUTOMATION COMPONENT, COMPUTER PROGRAM AND COMPUTER READABLE MEDIUM

BACKGROUND OF THE INVENTION

1. Field of the Invention

The invention refers to an industrial automation component, a computer program and a computer-readable medium and a method for configuring the industrial automation component.

2. Description of the Related Art

In the field of industrial automation engineering systems are known that can be used for engineering, programming and/or configuring industrial automation components in automation projects.

Industrial engineering systems, also known as project engineering tools for industrial applications, may be used for solution-design and implementation. Runtime-systems are used for later operation and/or management processes. Solutions are to be understood as industrial solutions for process and or discrete industries.

The engineering of an automation project (e.g., for a plant) usually comprises one or more of the following: determining the required functionality in the project, determining what components are needed to offer this functionality, allocating functionality and an actual physical position to the components in the plant, allocate communication structures to the components (e.g., what components are allowed to communicate with what other components and how they communicate, what actually is the purpose of the component), etc.

An automation project is associated with a real project for, e.g., setting up a new production/manufacturing line in a new or existing industrial machine or plant or a new or existing process plant. Some of many examples in which such automation projects are set up, are the manufacturing of vehicles in the automotive industry, producing electronics, producing food and beverage products and many more.

In these applications, the engineering system is used for generating one or more automation component configurations in the context of an industrial automation project. The industrial automation project can be, e.g., factory automation projects, process-industry automation projects and any further automation projects in an industrial context.

Engineering systems can particularly be used to configure functionalities of industrial automation components in the context of an industrial automation project, i.e., for the application intended by the user/operator, such as the operator of an industrial plant. An engineering system can, for example, be used to configure a display functionality of a Human Machine Interface (HMI) display panel of an automation system for a specific automation project/application. A user/operator or configuration engineer can, by use of an engineering system, configure what type of graph is used to visualize measurement data on the HMI display panel. Such a configuration can, for example, be performed via an input mask of the engineering system.

An example of an engineering system is available at the Totally Integrated Automation (TIA) web portal of Siemens AG (Totally Integrated Automation Portal). Another is example of an engineering system is described in the brochure, "iPDF: TIA Portal entdecken". Engineering systems can be embodied by software, for example, a program that is running on hardware of the user/operator.

With respect to the TIA portal, all products of the TIA domain, the complete family of SIMATIC products from Siemens AG, are available in the TIA portal, which is a fully integrated engineering system. With this product family and the TIA portal, a complete solution can be obtained. In contrast to a heterogeneous solution, where each product requires a specific engineering, a single tool is sufficient. With a fully-integrated system, the consistency of the solution across the products does not require extensive manual effort.

This offers the big advantage of comprehensively integrated engineering, ranging from field devices via programmable logic controllers (PLCs) (for example, the SIMATIC S7-1.200 and SIMATIC S7-1.500) and human machine interfaces (for example, SIMATIC comfort panels) up to a complete supervisory control and data acquisition (SCADA) system (an example of a SCADA-system is the SIMATIC WinCC Professional).

The comprehensive integration offers the user/operator an easy configuration of a complete machine, for example, comprising a number of components including field and control devices, HMI devices, or even a full plant. The downside is that all components and their configuration functionality must be available in the engineering system, for example, the TIA portal. This is even true for each different released version of the engineering system. As the number of automation components is large and this also holds for their functionalities, this imposes a large synchronization effort for the whole research and development organization at every release of the TIA portal. Currently, the release cycle of the TIA portal is on an annual basis.

It can be the case that a component implements functionalities that are not available/integrated in the (current version of an) engineering system and therefore cannot be configured by the engineering system. It can, for example, be that new features are already present in a device before the next release cycle of the engineering system and/or that specific features, in particular for a very specific use case, are not integrated in the general version of an engineering system.

It is known to the applicant to provide a channel support package (CSP) that allows the addition of configurability and runtime functionality for integration (by communication) with a new device. If, for example, there is a new communication protocol of an independent vendor, then the new communication protocol can be added to a prior release version of the engineering system. The prerequisite is that the configuration functionality is completely available.

It is furthermore known to the applicant to provide a hardware package (HSP) to the engineering system that allows the adding configurability of new hardware devices to a prior released version.

Here, the prerequisite is also that the configuration functionality is completely available. The configuration offering is adjusted to the specific functionality of the concrete new hardware device by a hardware description file (GSD).

SUMMARY OF THE INVENTION

It is an object of the present invention to provide an automation component and an alternative method that allows the configuration of the functionality of an industrial automation device that is not available in an engineering system belonging to the device, which can be implemented with comparably low expenditure.

This and other objects and advantages are achieved in accordance with the invention by an industrial automation component and a method for configuring an industrial automation component, whereby at least one feature of the industrial automation component that is not configurable with an engineering system supporting the component, non-supported feature, is configured by interpreting a description of a configuration of the at least one non-supported feature with an on-board compiler of the component and integrating the interpreted description to a basic configuration having been generated with the engineering system and with respect to at least one further feature, supported feature, of the component.

In accordance with the invention, the industrial component is preferably characterized in that the component is configured to receive a description of a configuration of at least one feature of the component that is not configurable with an engineering system supporting the component, non-supported feature, and comprises an on-board compiler that is configured to interpret the description and the component is configured to integrate the interpreted description to a basic configuration having been generated with the engineering system and with respect to at least one further feature, supported feature, of the component.

An automation component can be a hardware component, for example a device, and/or a software component or a combination of both. Automation components include but are not limited to: programmable logic controllers (PLCs), I/O modules, industrial communication devices, industrial networking components, sensors, actors, drives, HMI panels and other industrial devices commonly used in the process or automation industry. Software components that share hardware with other components are also configurable by the method.

The invention, in other words, is complementing the configurability of automation components with an engineering system for non-supported features, in particular runtime features.

A feature or features of an automation component can, for example, lack support by an engineering system, in which the component itself is contained and in particular other features thereof are available/supported, because the feature is newly added to an already existing component and so far not available/integrated in the current release version of the engineering system. In this case, the time period until the next release version can be bridged with the inventive method. Accordingly, the invention enables early delivery of newly added features of automation components. Value can be provided independently from the release cycle of the engineering system.

Alternatively, or in addition, non-supported features might be specific features that are (maybe deliberately) not integrated in the engineering system, which supports only more general features. The invention makes it also possible to deliver such specific features.

Accordingly, new and/or specific functionality which is not (yet) available in the engineering system can be added by the invention.

The invention furthermore enables independent development of runtime functionality. Functionality can be designed, developed and tested without any interaction with the engineering system (development team). After that, the development team of an engineering system can rely on a readily available, fully functional and tested feature.

The non-supported features in particular are functional features providing a functionality, preferably runtime functionality of automation components. This can also be the case for supported features. A supported or non-supported feature needing configuration can, for example, be a (runtime) display feature/functionality (for example, a polar chart in addition to a cartesian trend) of an HMI display panel of an automation system that has to be configured for a specific automation project or application.

Other examples are i) a screen change via gestures, as popular on smart phones. Defining the neighboring relations (i.e., what screens to show when swiping to the left, right, up, down) would require a new editor in an engineering system; ii) notifying on critical events by pushing critical alarms on smart phones of users, via Apple or Google notification services or alternatively via social media channels, like WhatsApp or Twitter. Configuring the accounts and their credentials to be used would require a new editor in an engineering system; or iii) publishing readings of critical process states (e.g., fill level of a tank) to a cloud service for further analytics. Configuring the accounts and their credentials to be used would require a new editor in an engineering system.

In accordance with the invention added, non-supported (runtime) functionality is described in parallel in particular in at a least file that is loaded to the component. In case a configuration is needed for more than one non-supported feature, a description for the configuration of several of those features can be provided.

It can be the case that one description regarding more than features is provided or that several descriptions, each for one feature, are provided. One description for more than one features can in particular be provided for features that are connected to each other or build on one another.

The description of the configuration of at least one non-supported feature is preferably provided as a textual description. It can, for example, be provided in the form of a text file. In a preferred embodiment, the description is provided in the form of a text file that is human and machine readable. A text file can be generated, in particular written, by an engineer who wants to configure the added functionality.

The description can be generated, in particular written within an editor, preferably in a plain text editor. It is also possible that an IDE editor is used which can for example be installed on hardware of a user/operator who wants to obtain the configuration. After generation/writing the description, it is transferred to the automation component. One preferable option is to use a web browser for transferring (uploading) the description file to the automation component.

It is also possible to use an online editor for generating, in particular writing the description. The description can be generated, in particular within/with the use of a web browser. The description can be inserted as text in the web browser. It is also possible that a visual (graphical) editor is used.

If a web browser is used for generating and/or transferring the description, the automation component can comprise/implement a web server. It is also possible that a web server is implemented/running in a cloud. The description is then interpreted by the on-board compiler. This in particular means or includes that it is translated into machine code.

In a particularly preferred embodiment, the interpretation of the description includes translating the description into optimized binary machine code, in particular in short code. The interpretation can deliver a machine-readable binary and compact version of the description.

The code is integrated to/merged with a basic configuration. In a preferable embodiment, the integration/merging of the interpreted description is performed by the on-board compiler or an integration module disposed on the automation component. The inventive automation component preferably comprises an integrating module which is embodied and/or configured accordingly. The integration module can be a hardware module and/or a software module or a combination of both.

The description of the configuration of the at least one non-supported feature is in a further preferred embodiment provided in a domain specific language (DSL). The non-supported feature(s) preferably are textually described in a domain specific language, which allows even medium skilled end users to formulate such descriptions of a feature configuration. As explained at Wikipedia, a DSL preferably is a computer language specialized to a particular application domain.

In another preferred embodiment, integration occurs within integrated development environments (IDEs), which are described at Wikipedia.

To avoid needing to know the complete syntax, the DSL can be provided to existing wide-spread integrated development environments (IDE) via plug-ins or meta-descriptions of the DSL. This would work independently of the basic configuration. Examples of IDEs are Eclipse or Visual Studio Code.

It is also possible that IDE integration for reference name search, completion, validation and semantic checks is provided. As the additional configuration might need to refer to existing objects (for example, adding a new type of gauge to an HMI panel/screen), the objects and especially object-names might be necessary for early checks. This may also be offered as plug-ins to an IDE. Accordingly, knowledge of the basic configuration might be required. For this, online connection to the automation component might be provided and/or an offline (maybe tailored) instance of the basic configuration might be provided or obtained.

The basic configuration can be obtained using the engineering system that the automation component is available/integrated within. The basic configuration preferably regards features that are supported by the engineering system. The basic configuration can, for example, be generated with the engineering system and then be loaded to the automation component.

The basic configuration preferably will be generated with the engineering system before the integration of the interpreted description to the basic configuration.

In a preferred embodiment, the on-board compiler also validates the description of the at least one non-supported feature. The compiler is configured accordingly. Due to the validation, an engineer can, for example, be sure that an extension of a configuration can indeed be processed.

In accordance with another preferred embodiment, the description of a configuration of the at least one non-supported feature is also provided to the engineering system so that it can be imported to the next release version of the engineering system. Preferably, the description is provided to the engineering system sometime after being provided to the component so that it can be tested before integration into the next release version.

It is also an object of the invention to provide a computer program comprising instructions which, when the program is executed by at least one computer or by an automation component, cause the at least one computer or automation component to perform the method in accordance with the disclosed embodiments.

It is also an object of the invention to provide a non-transitory computer-readable medium comprising instructions which, when executed on at least one computer or on an automation component, cause the at least one computer or automation component to perform the steps of the method in accordance with the disclosed embodiments.

An automation component can, in the much the same manner as like a computer, comprise at least one processor that is operable to execute software instructions.

The non-transitory computer-readable medium can be, for example, a CD-ROM or DVD or a USB or flash memory. It should be noted that a computer-readable medium should not be understood exclusively as a physical medium, but that such a medium can also exist in the form of a data stream and/or a signal representing a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention become clear by the following description of embodiments of the invention with reference to the enclosed drawing, in which.

DETAILED DESCRIPTION OF THE EXEMPLARY EMBODIMENTS

Figure 1:
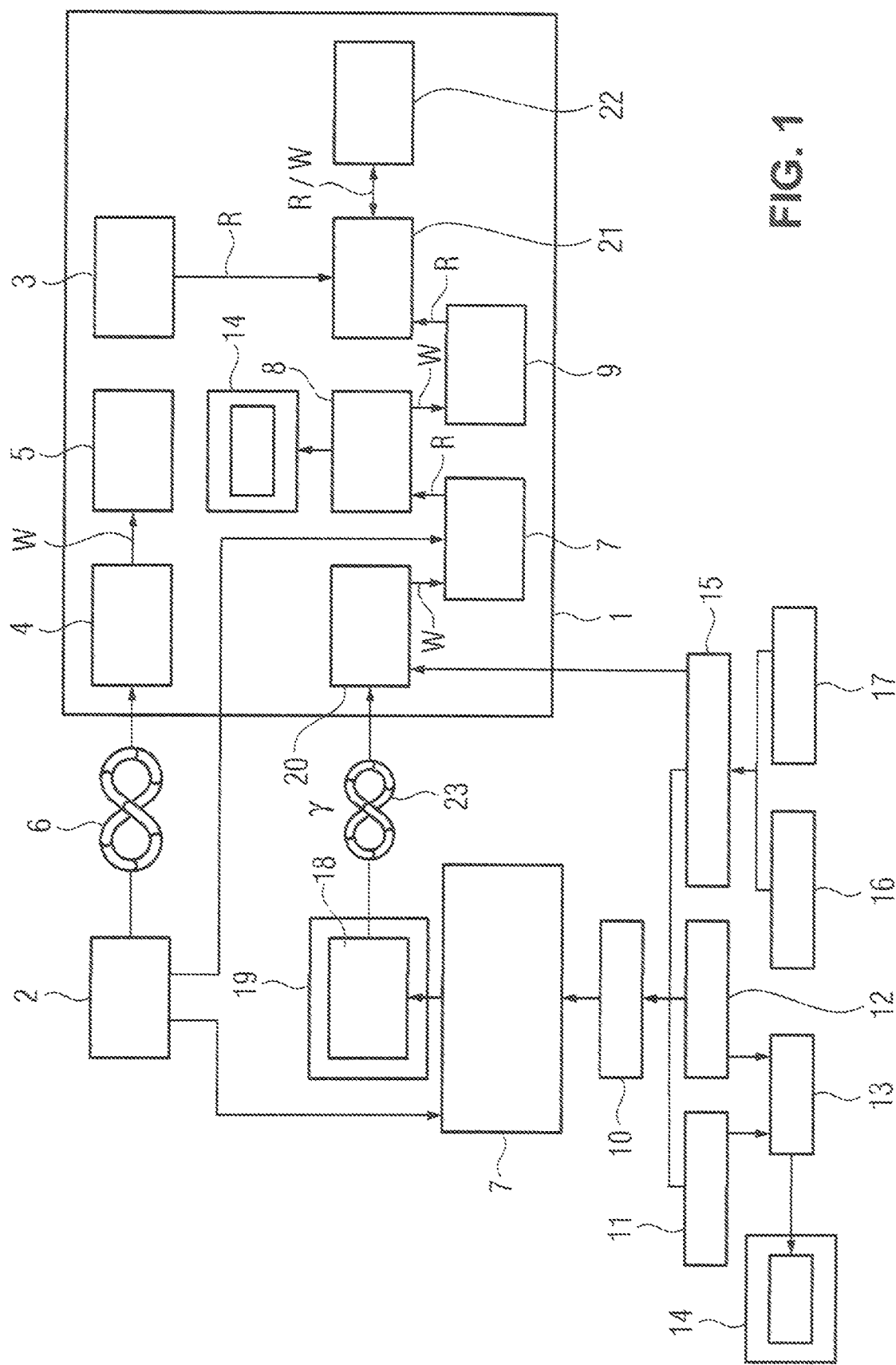
FIG. 1 is a purely schematic illustration showing an inventive automation component, an engineering system and steps of the inventive method.

FIG. 1 is a purely schematic illustration showing an example of an inventive automation component 1 in the form of a Human Machine Interface (HMI) panel as well as an engineering system 2. In the illustrated example, the engineering system 2 is the TIA-Portal and the automation component 1 is a SIMATIC HMI Unified Comfort Panel, both by Siemens Ag.

The panel 1 is part of an industrial automation plant/machine that can, for example, be located in a hall and operated by a user/operator. The plant/machine comprises, in a manner known per se, a number of automation components, inter alia, controls, such as programmable logic controllers (PLCs), I/O devices, sensor, actuators, and further HMI panels and so on. The engineering system is installed on an industrial PC, which is also located 2 in the vicinity of the other automation components.

It is possible to configure runtime features of the panel 1 with the help of the engineering system 2. For this purpose, a basic configuration 3 is generated with the engineering system 2, fully downloaded on the automation component 1 and saved thereon, i.e., written to a memory of the component 1. This comprises operator screen, built with visualization elements, such as gauge meters, bar graphs, input-fields, alarm views, trend charts and many more.

In the illustrated example, the component 1 comprises a system configuration module 4 that receives and writes the basic configuration 3 to the panel's 1 memory. After a first full download of the full basic configuration, smaller amended parts 5 of the configuration will be iteratively downloaded from the engineering system 2 to the component 1 and written to the component's persistent memory due to offering quick and easy handling of small changes and allowing the operator panel to keep running, although small configuration changes are downloaded and activated (becoming effective). The smaller amended parts 5 of the configuration can be called "delta configuration", the delta indicating the "small part" aspect.

In FIG. 1, the iterative nature of this approach is indicated by an infinity sign 6.

Runtime features of the further automation components of the plant/machine can also be configured in the same manner.

It can be the case that one or more of the automaton components 1 implement features that are supported by the engineering system 2 and can be configured with it, supported functionalities/features, but also functionalities that are not available/integrated in the (current version of the) engineering system 2 and therefore cannot be configured by it. It can, for example, be that new features are already present in a device 1 before the next release cycle of the engineering system 2 and/or that specific features, in particular for a very specific use case, are not integrated in the general, installed version of the engineering system 2.

With respect to the HMI panel 1 shown in FIG. 1, while configuration of the display feature of showing data in one kind of graph (for example, using a Cartesian coordinate system) on the panel 1 is supported, configuration of showing data in another kind of graph (for example, using a polar coordinate system) is not. In detail, while the panel 1 has the feature of displaying data in a polar graph as already built-in functionality, this cannot be configured with the current release version of the engineering system installed on the configuration engineer computer, because the feature is rather new or only for very specific, selected customers or particular industries.

To solve this problem, in accordance with the invention, a feature or features that are not (yet) configurable with the engineering system 2 supporting the component 1, non-supported feature(s), is/are configured without the help of the engineering system 2 by interpreting a description 7 of a configuration of the non-supported feature(s) with an on-board compiler 8 of the component 1 and integrating the interpreted description 9 to the basic configuration 3 having been generated with the engineering system 2 that regards the supported features of the component 1.

In detail, a description 7 of the configuration of the non-supported feature or features is provided by the configuration engineer. The description 7 is provided in a domain specific language (DSL). The textual description can be generated/written in an editor 10 (see FIG. 1). The non-supported feature(s) are textually described in a domain specific language, which allows even medium skilled configuration engineers to formulate such descriptions 7 of a feature configuration without requiring in-depth knowledge a priori.

To avoid needing to know the complete syntax, the description 7 in a DSL can be amended to existing widespread integrated development environments (IDEs), such as eclipse 11 (by Eclipse Foundation, Inc.) or visual studio code 12 (by Microsoft, corp.) via plug-ins 13 or DSL-meta-descriptions. This would work independently of the basic configuration 3.

It is also possible that IDE integration for reference name search, completion, validation and semantic checks is provided. As the additional configuration to be obtained via the description 7 might need to refer to existing objects (for example, adding a new type of gauge or a polar chart to a HMI panel/screen), the objects and especially object-names might be necessary for early checks. This might also be offered as plug-in 13 to an IDE. Accordingly, knowledge of the basic configuration might be required. For this, online connection to the automation component 1 might be provided and/or an offline (maybe tailored) instance of the basic configuration might be provided or obtained. Such a copy can be obtained from a name service 14 implemented on the component 1, as shown on the lower left corner of FIG. 1. It should be noted that the component's name service 14 is again illustrated in the left lower corner for reasons of clarity only.

What is offered by eclipse 11 or visual studio code 12 with the plug-in 13 as rich client can also be offered as a pure web application.

It is also possible to use a web browser 15, for example Chrome, Firefox or Opera, to generate the description 7. Here, a code editor 16 can, for example, be used or a visual (graphical) editor 17 (e.g., screens) that is also shown in FIG. 1 in a purely schematic manner.

One example of a textual description 7 of a configuration of non-supported features of panel 1 is:

```
<feature-a="50" attribute-a="25">
    <feature-b="62" attribute-b="90"/>
    <feature-c>
        <subfeature-a="62" attribute-c="90"/>
        <subfeature-b="15"/>
        <subfeature-c="76" attribute-d="15"/>
    </feature-c>
    <feature-e="100" attribute-e="60"/>
    <feature-f="25" attribute-f="20" attribute-g="180"/>
    <feature-g="32" attribute-h="0.5"/>
    <feature-h="0.33" attribute-i="24"/>
</feature-a>
```

In this example, visualization features of panel 1 are described. While in the example features and attributes are abstractly named a, b, c, . . . , a configuration engineer writing a description 7 can use names that are specific for the use case ("domain specific") and that are known to him and easy to understand. Instead of a "feature-x" the configuration engineer could for example write "scale". While in the example description 7 only numbers are written behind the equal signs, this is not to be understood as restrictive. It should be understood it is possible that alternatively or in addition to numbers the features and/or attributes are followed by words, such as "attribute-a=blue".

Furthermore, it is emphasized that the above description 7 is to be understood purely as one possible example of a textual description 7 and it should be understood other descriptions 7 can be provided alternatively or in addition. If, for example, not a panel 1 but another automation component needs to be configured alternatively or in addition, it should be understood a provided description 7 could alternatively or in addition to visualization features also regard other kinds of features.

Furthermore, in an editor, description 7 will preferably be shown with syntax highlighting, such as syntax highlighting by color.

Independent from which kind of editor is used to generate, in particular write a description 7, one possibility to transfer it to the automation component 1 and provide it to the component 1 is to use a description upload page 18 in/via a browser 19 as shown in FIG. 1.

The component 1 therefore implements a web server 20. The description 7 received by the web server 20 is written to the component's memory. In FIG. 1, this is schematically depicted by an arrow from the web server 20 to a local version of the description 7 and the letter "W" for write next to the arrow.

The web server 20 delivers the web application 18. The browser 19 is the execution environment for the web application 18.

TIA portal offers a fully-graphical editor, within or with which, for example, the construction elements of an HMI operating screen can be assembled and configured. This can also be realized via a web server 20, web application 18 and browser 19. Here, a fully graphical editor, in particular drag-and-drop graphical editor, will be provided instead of (or additionally to) a text editor.

In the next step, the version of the saved description 7 is read by the component's on-board compiler 8 (in FIG. 1 illustrated by an arrow from the saved description 7 to the compiler 8 an "R" for read next to it) and interpreted to obtain a machine-readable binary and compact version of the description 9. In other words, with the use of compiler 8 the user-/configuration-engineer-oriented version of description 7 written by a user/configuration engineer in a domain specific language is converted to a machine-oriented version 9.

The interpreted, machine readable version 9 is again written to the component's memory. The compiler 8 contacts/is connected to the name service 14 that is illustrated in FIG. 1 by an arrow from the compiler 8 to the name service. The compiler 8 should know the existing object's names and should able to address them in terms of content because he modifies them. After adding a round-pointer instrument to or after replacing a Cartesian curve with a polar version, for example, an operating panel is no longer the same. This name resolution and object identification is done by the relationship from the compiler 8 to the name service 14.

The compiler 8 not only interprets the description 7 but also validates the description 7. The web server 20 will also output success or error messages, for example, if a round-pointer instrument shall be added to a screen that does not exist.

The machine-readable, binary and compact version of the description 9 is read by an integration module 21 of the component 1. The integration module 21 also reads the (current) basic configuration 3 that was obtained from the engineering system 2. The engineering systems 2 provides the basic configuration in a machine-readable, binary and compact state.

The integration module 21 integrates, in other words, merges the machine-readable, binary and compact version of the description 9 of the feature or features that are not supported by the engineering system (non-supported feature(s)) to the basic configuration 3 regarding the features that are supported by the engineering system 2 (supported features). In this way, a complete configuration 22 for supported as well as non-supported features is obtained. The complete configuration 22 is written to the component's memory by the integration module 21 as is schematically illustrated by an arrow from the integration module 21 to the complete configuration 22 and can also be read (R/W). The complete configuration 22 will, for example, be read such that a runtime-system at start up knows what is to be displayed.

Descriptions 7 of a configuration of non-supported features can (in analogy to the "delta configuration") be provided iteratively to the component 1. Via a repeated provision a configuration can, for example, be improved until a desired result is obtained. In FIG. 1, this is illustrated by a further infinity sign 23.

Descriptions 7 of a configuration of one or more non-supported features of the component 1 can in a preferred embodiment also be provided to the engineering system 2. The description(s) 7 can, for example, be read by the engineering system 2 that is schematically illustrated in FIG. 1 by arrows from the engineering system 2 to the description 7 depicted below browser 19 and the description 7 saved on the component 1. The descriptions can then be imported into the next release of the engineering system. The respective features can then become supported features.

It should be noted that the component 1 shown in FIG. 1 is an exemplary embodiment of an inventive automation component that is configured to implement the above-described exemplary embodiment of the method in accordance with the invention.

The on-board compiler 8 as well as the integration module 21 of the component 1 can be purely software-implemented modules. The same holds for system configuration module 4.

Figure 2:
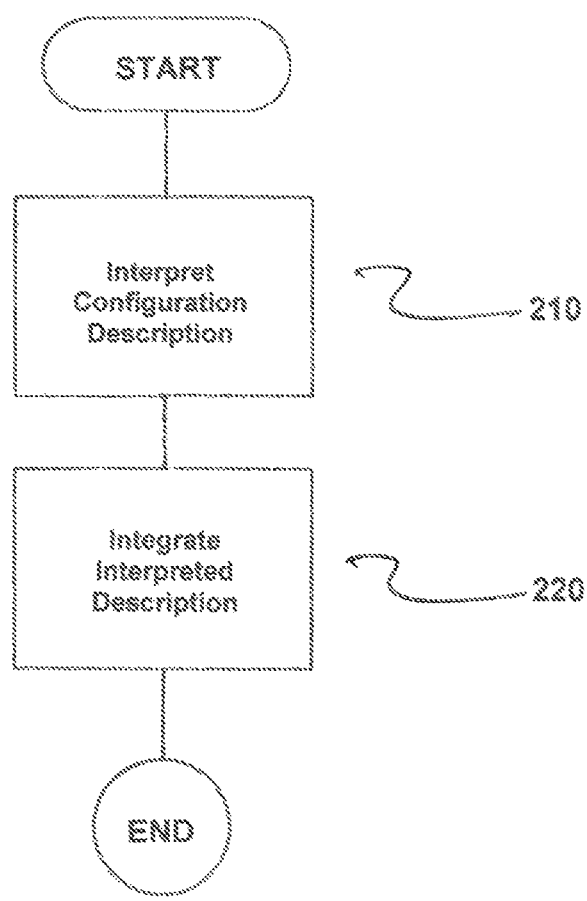
FIG. 2 is a flowchart of the method in accordance with the invention.

FIG. 2 is a flowchart of a method for configuring an industrial automation component 1. The method comprises interpreting a description 7 of a configuration of the at least one non-supported feature with an on-board compiler 8 of the component 1 to configure at least one feature of the industrial automation component 1 that is not configurable with an engineering system 2 supporting the component 1, non-supported feature, as indicated in step 210.

Next, the interpreted description 9 is integrated to a basic configuration 3 having been generated with the engineering system 2 and with respect to at least one further feature, supported feature, of the component 1, as indicated in step 220.

The inventive method and automation component provide several advantages. On the one hand, the configurability of automation components with an engineering system for non-supported features is complemented. The disclosed embodiments of the invention furthermore enable independent development of runtime functionality. Functionality can be configured, developed and tested without any interaction with the engineering system (development team). After that, the development team of an engineering system 2 can rely on a readily available, fully functional and tested feature.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It is for example to be understood that while FIG. 1 exemplarily shows one automation component 1 of an industrial automation plant/machine in the form of an HMI panel, several automation components of a machine/plant can be configured for performing the disclosed embodiments of the method in accordance with the invention. Accordingly, on or more further components, for example, further HMI panels or PLCs or I/O devices of the plant/machine to which the panel 1 of FIG. 1 belongs, can be configured to perform the disclosed exemplary embodiments of the method in accordance with the invention. Preferably, all automation components of a plant/machine that have new (or specific) non-supported features are configured in accordance with disclosed embodiments of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring an industrial automation component, the method comprising:
   interpreting a description of a configuration of at least one non-supported feature with an on-board compiler of the industrial automation component to obtain a machine-readable binary version of the description, said on-board compiler validating the machine-readable binary version of the description to configure the at least one non-supported feature of the industrial automation component which is not configurable with an engineering system supporting the industrial automation component; and
   integrating the machine-readable binary version of the description with a basic configuration which was generated with the engineering system with respect to at least one further supported feature of the industrial automation component to obtain a complete configuration including the at least one further supported feature and the at least one non-supported feature; and
   writing the complete configuration to memory of the industrial automation component.

2. The method according to claim 1, wherein the basic configuration is generated with the engineering system before the integration of the machine-readable binary version of the description with the basic configuration.

3. The method according to claim 1, wherein the machine-readable binary version of the description of the configuration of the at least one non-supported feature is provided as a text file.

4. The method according to claim 2, wherein the machine-readable binary version of the description of the configuration of the at least one non-supported feature is provided as a text file.

5. The method according to claim 1, wherein the machine-readable binary version of the description of the configuration of the at least one non-supported feature is provided via a web browser.

6. The method according to claim 1, wherein the on-board compiler validates the machine-readable binary version of the description of the configuration of the at least one non-supported feature.

7. The method according to claim 1, wherein the machine-readable binary version of the description of the configuration of the at least one non-supported feature is provided in a domain specific language.

8. The method according to claim 1, wherein said interpreting the description includes translating the description into binary machine code.

9. The method according to claim 1, wherein the integration of the interpreted machine-readable binary version of the description with the basic configuration is performed by one of (i) the on-board compiler and (ii) an integration module of the industrial automation component.

10. A computer program comprising instructions which, when executed by at least one computer or by the industrial automation component, causes the at least one computer or the industrial automation component to perform the method of claim 1.

11. An industrial automation component comprising:
    a processor having memory; and
    a compiler;
    wherein the compiler is configured to:
        interpret a description of a configuration of at least one non-supported feature to obtain a machine-readable binary version of the description and validate the machine-readable binary version of the description to configure the at least one non-supported feature of the industrial automation component which is not configurable with an engineering system supporting the industrial automation component; and
        integrate the machine-readable binary version of the description with a basic configuration which was generated with the engineering system with respect to at least one further supported feature of the industrial automation component to obtain a complete configuration including the at least one further supported feature and the at least one non-supported feature;
    wherein the complete configuration is written to the memory of the industrial automation component.

12. The industrial automation component according to claim 11, wherein the industrial automation component is configured to receive the machine-readable binary version of the description of the configuration of the at least one non-supported feature of the industrial automation component which is not configurable with the engineering system supporting the industrial automation component and comprises the compiler configured to interpret the machine-readable binary version of the description and the industrial automation component is configured to integrate the machine-readable binary version of the description with the basic configuration having been generated with the engineering system with respect to the at least one further supported feature of the industrial automation component to obtain the complete configuration including the at least one further supported feature and the at least one non-supported feature.

13. The industrial automation component according to claim 11, wherein the industrial automation component is a Human Machine interface (HMI) panel.

14. The industrial automation component according to claim 12, wherein the industrial automation component is a Human Machine interface (HMI) panel.

15. The industrial automation component according to claim 11, wherein one of (i) the compiler is configured to integrate the machine-readable binary version of the description with the basic configuration and (ii) the industrial automation component comprises an integration module which is configured to integrate the machine-readable binary version of the description with the basic configuration.

16. The industrial automation component according to claim 12, wherein one of (i) the compiler is configured to integrate the machine-readable binary version of the description with the basic configuration and (ii) the industrial automation component comprises an integration module which is configured to integrate the machine-readable binary version of the description with the basic configuration.

17. The industrial automation component according to claim 13, wherein one of (i) the compiler is configured to integrate the machine-readable binary version of the description with the basic configuration and (ii) the industrial automation component comprises an integration module which is configured to integrate the machine-readable binary version of the description with the basic configuration.

18. A non-transitory computer-readable medium comprising instructions which, when executed on at least one computer or on an industrial automation component, cause the at least one computer or the industrial automation component to configure the industrial automation component, the instructions comprising:

program code for interpreting a description of a configuration of at least one non-supported feature with an on-board compiler of the industrial automation component to obtain a machine-readable binary version of the description, said on-board compiler validating the machine-readable binary version of the description to configure the at least one non-supported feature of the industrial automation component which is not configurable with an engineering system supporting the industrial automation component; and program code for integrating the machine-readable binary version of the description with a basic configuration which was generated with the engineering system with respect to at least one further supported feature of the industrial automation component to obtain a complete configuration including the at least one further supported feature and the at least one non-supported feature; and program code for writing the complete configuration to memory of the industrial automation component.

\* \* \* \* \*